UNITED STATES PATENT OFFICE.

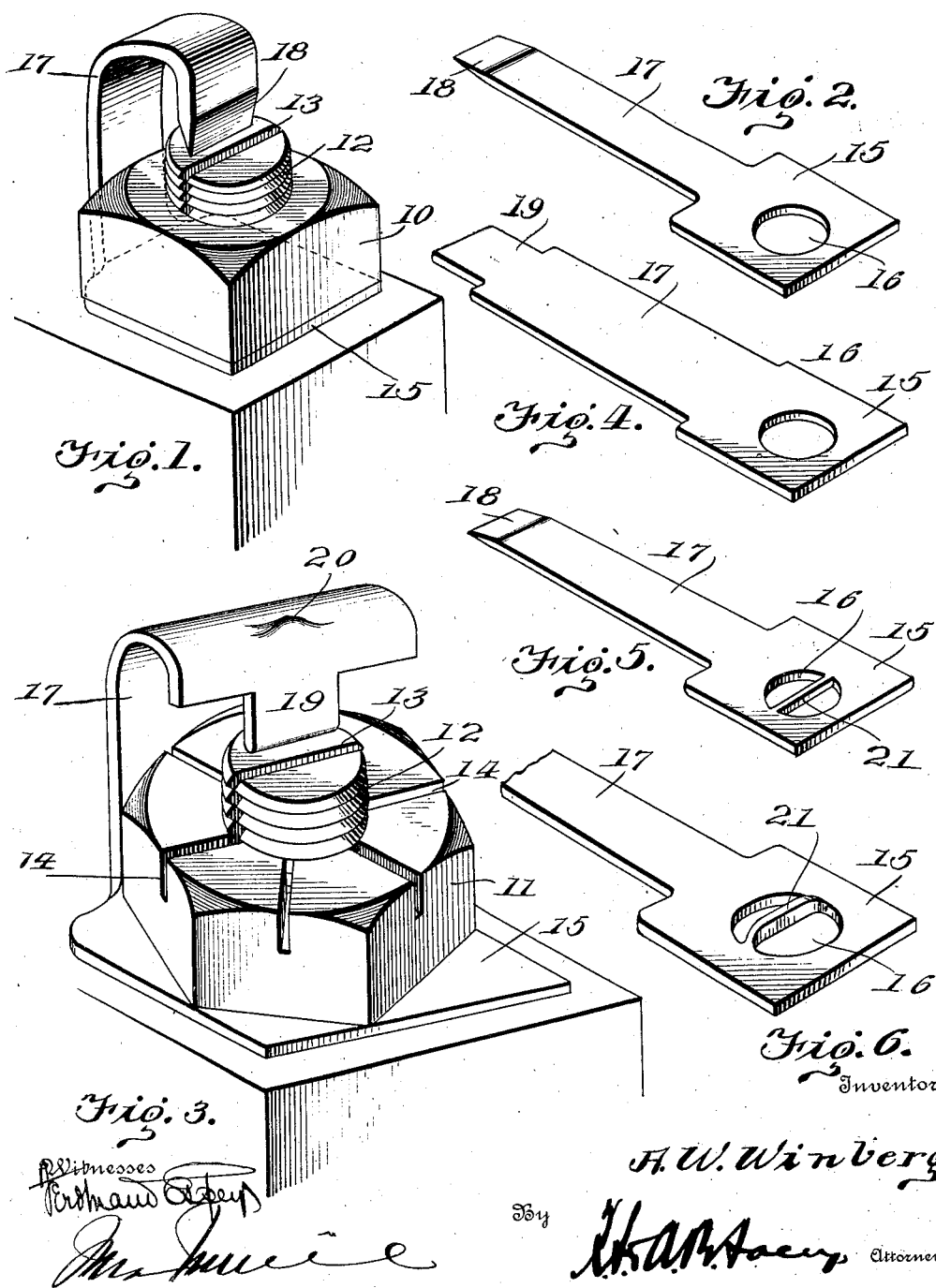

ANDERS W. WINBERG, OF SAN JOSE, CALIFORNIA, ASSIGNOR OF ONE-THIRD TO F. B. BROWN AND ONE-THIRD TO W. F. CURRY, BOTH OF SAN JOSE, CALIFORNIA.

NUT-LOCK.

1,091,177. Specification of Letters Patent. Patented Mar. 24, 1914.

Application filed February 28, 1913. Serial No. 751,338.

*To all whom it may concern:*

Be it known that I, ANDERS W. WINBERG, citizen of the United States, residing at San Jose, in the county of Santa Clara and State of California, have invented certain new and useful Improvements in Nut-Locks, of which the following is a specification.

This invention relates to improvements in nut locks, and has for one of its objects to improve the construction and increase the efficiency and utility of devices of this character.

Another object of the invention is to provide a simply constructed device which may be readily applied to nuts and bolts of various sizes and forms and to nuts and bolts employed for various purposes, and without decreasing the strength or resisting qualities of the nut or the bolt and which may be repeatedly used.

Another object of the invention is to provide a simply constructed device whereby the nut is prevented from retrograde movement by expanding the bolt in the nut to a sufficient extent to effectually prevent the nut from working loose thereon.

With these and other objects in view the invention consists in certain novel features of construction as hereinafter shown and described and then specifically pointed out in the claims, and in the drawings illustrative of the preferred embodiment of the invention.

Figure 1 is a perspective view of a bolt and nut with the improved device applied. Fig. 2 is a perspective view of the blank from which the locking member is constructed. Fig. 3 is a perspective view of a slightly different form of the improved device. Fig. 4 is a perspective view of the blank from which the modified structure shown in Fig. 3 is constructed. Figs. 5 and 6 are views similar to Fig. 2 illustrating other modifications in the construction.

Corresponding and like parts are referred to in the following description and indicated in all the views of the drawings by the same reference characters.

In Fig. 1 the improved device is shown applied to an ordinary square nut 10, while in Fig. 3 the device is shown applied to an ordinary hexagonal nut 11. The bolt, represented conventionally at 12, is formed with a longitudinally extending cleft 13 in its threaded end. In the construction shown in Fig. 1 the nut is not changed, while in the construction shown in Fig. 3 the nut is provided with a plurality of radial recesses or clefts 14.

The locking attachment comprises a plate 15 having an aperture 16 to engage over the bolt and with a tongue 17 extending from one side. In the construction shown in Figs. 1 and 2 the tongue is relatively narrow and uniform in width throughout and with a reduced terminal 18, while in the modification shown in Figs. 3 and 4 the tongue is relatively wider and reduced at the outer end to form a terminal 19 of less width than the tongue. The tongue in both of the forms shown in Figs. 1—2—3—4 is bent upwardly against the nut and over the outer end of the bolt as shown in Figs. 1 and 3. When the structure shown in Figs. 1 and 2 is employed the tongue is bent so that the reduced terminal 18 is located above the cleft 13 of the bolt, and after the nut has been turned "home" and the tongue bent up against the nut, the terminal 18 is driven downwardly to cause it to enter the cleft 13 of the bolt to expand the bolt against the interior of the nut, and thus assist in locking the bolt in position and coacting with the nut engaging portion of the tongue to prevent the retrograde movement of the nut.

In the construction shown in Fig. 3 the same operation takes place but the body of the tongue 17 is driven to a greater extent into the bolt, or until the contracted portion 19 pass downwardly into the cleft 13 of the bolt and the unreduced portion of the tongue enters an opposite pair of the clefts or recesses 14 of the nut 11 and thus effectually locks the bolt and the nut together and prevents retrograde movement of the nut.

In the structure shown in Figs. 3 and 4 the tongue 17 is provided with a projection 20 to receive the blow of a hammer when the tongue is being forced into engagement with the bolt and nut.

In Fig. 5 a slight modification in the construction of the plate 15 is shown consisting in forming a tongue or web 21 transversely of the bolt receiving aperture 16 and adapted to enter the cleft 13 of the bolt before the nut is applied.

In Fig. 6 the web 21 is shown somewhat wider than in Fig. 5 to increase its strength and its resisting qualities.

By this means it will be obvious that an effectual nut lock is produced which may be applied to nuts and bolts of various sizes and to nuts and bolts employed for various purposes, and which may be readily detached when the nut is to be removed without fracturing any of the parts.

Having thus described the invention, what is claimed is:

1. In a nut lock, a bolt having a cleft in its threaded end, a nut engaging the bolt, and a washer engaging around the bolt and beneath the nut and having a bar transversely of its aperture for engaging in the cleft of the bolt and with a lateral tongue adapted to be bent against the nut and over the same with its terminal forced into the cleft of the bolt.

2. In a nut lock, a bolt having a cleft in its threaded end, a nut engaging the bolt and having radial recesses in its outer face, and a washer engaging around the bolt and beneath the nut and having a lateral tongue adapted to be bent against the nut and over the same, the free end of said tongue adapted to be seated in the clefts of the nut and provided with an intermediate projection adapted to engage in the cleft of the bolt.

In testimony whereof I affix my signature in presence of two witnesses.

ANDERS W. WINBERG. [L. S.]

Witnesses:
F. B. BROWN,
W. P. CURRY.